United States Patent
Kim et al.

(10) Patent No.: US 9,019,458 B2
(45) Date of Patent: Apr. 28, 2015

(54) DISPLAY DEVICE AND MANUFACTURING METHOD THEREOF

(71) Applicant: Samsung Display Co., Ltd., Yongin-si, Gyeonggi-Do (KR)

(72) Inventors: Won Tae Kim, Suwon-si (KR); Yong Seok Kim, Seoul (KR); Sung Hwan Won, Suwon-si (KR); Seon Uk Lee, Seongnam-si (KR); Kyung Tae Chae, Hwaseong-si (KR); Pil Sook Kwon, Incheon (KR); Dae Ho Lee, Seoul (KR); Woo Jae Lee, Yongin-si (KR); Tae Woo Lim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 36 days.

(21) Appl. No.: 14/047,242

(22) Filed: Oct. 7, 2013

(65) Prior Publication Data
US 2014/0300853 A1    Oct. 9, 2014

(30) Foreign Application Priority Data

Apr. 4, 2013 (KR) .......... 10-2013-0036940

(51) Int. Cl.
*G02F 1/1339* (2006.01)
*G02F 1/1343* (2006.01)

(52) U.S. Cl.
CPC ........ *G02F 1/134336* (2013.01); *G02F 1/1339* (2013.01)

(58) Field of Classification Search
None
See application file for complete search history.

(56) References Cited

U.S. PATENT DOCUMENTS

| 5,386,307 | A  | * | 1/1995  | Jang ............................. 349/81 |
| 2012/0062448 | A1 | * | 3/2012  | Kim et al. ...................... 345/55 |
| 2013/0321734 | A1 |   | 12/2013 | Won et al. |
| 2014/0152948 | A1 |   | 6/2014  | Chae et al. |

FOREIGN PATENT DOCUMENTS

| KR | 10-2013-0134153 | 12/2013 |
| KR | 10-2014-0025739 | 3/2014 |

\* cited by examiner

*Primary Examiner* — Richard Kim
(74) *Attorney, Agent, or Firm* — Cantor Colburn LLP

(57) ABSTRACT

A display device includes: a substrate, on which pixel areas arranged substantially in a matrix form having pixel rows and pixel columns are defined; a thin film transistor disposed on the substrate; a pixel electrode disposed in the pixel areas and connected to the thin film transistor; common electrodes disposed on the pixel electrode and spaced apart from the pixel electrode, where a microcavity is defined between the pixel electrode and the common electrodes; a roof layer disposed on the common electrodes, where a liquid crystal injection hole is defined through the common electrodes and the roof layer and exposes the microcavity; a liquid crystal layer disposed in the microcavity; and an encapsulation layer disposed on the roof layer, where the encapsulation layer covers the liquid crystal injection hole and seals the microcavity, where the common electrodes in the pixel rows are connected to each other.

20 Claims, 13 Drawing Sheets

DISPLAY DEVICE AND MANUFACTURING METHOD THEREOF

This application claims priority to Korean Patent Application No. 10-2013-0036940, filed on Apr. 4, 2013, and all the benefits accruing therefrom under 35 U.S.C. §119, the content of which in its entirety is herein incorporated by reference.

BACKGROUND (1) Field

Exemplary embodiments of the invention relates to a display device and a manufacturing method of the display device, and more particularly, to a display device in which an equipotential is generated substantially entirely on a common electrode, and a manufacturing method of the display device.

(2) Description of the Related Art

A conventional liquid crystal display device, which is one of the most widely used types of flat panel display, typically includes two display panels with field generating electrodes such as a pixel electrode, a common electrode, and the like and a liquid crystal layer interposed between the two display panels. The liquid crystal display device generates an electric field in the liquid crystal layer by applying a voltage to the field generating electrodes to determine alignment of liquid crystal molecules of the liquid crystal layer through the generated electric field and control polarization of incident light, thereby displaying images.

The two display panels of the liquid crystal display device may include a thin film transistor array panel and an opposing display panel. In the thin film transistor array panel, a gate line for transferring a gate signal and a data line for transferring a data signal are disposed crossing each other, and a thin film transistor connected to the gate line and the data line, a pixel electrode connected to the thin film transistor, and the like may be provided. In the opposing display panel, a light blocking member, a color filter, a common electrode, and the like may be provided. In the liquid crystal display, the light blocking member, the color filter, and the common electrode may be further provided on the thin film transistor array panel.

In such a conventional liquid crystal display device, each of the two display panels includes a substrate, and respective constituent elements are provided on the substrate of each of the two display panels.

SUMMARY

Exemplary embodiments of the invention relate to a display device having light weight and reduced thickness by including a single substrate, and a manufacturing method of the display panel with reduced cost and reduced processing time by manufacturing the display device using a single substrate.

Exemplary embodiments of the invention relate to a display device in which an equipotential is generated on a common electrode therein, and a manufacturing method of the display device.

An exemplary embodiment of the invention provides a display device, including: a substrate, on which a plurality of pixel areas arranged substantially in a matrix form having a plurality of pixel rows and a plurality of pixel columns is defined; a thin film transistor disposed on the substrate; a pixel electrode disposed in the pixel areas and connected to the thin film transistor; a plurality of common electrodes disposed on the pixel electrode and spaced apart from the pixel electrode, where a microcavity is defined between the pixel electrode and the common electrodes; a roof layer disposed on the common electrodes, where a liquid crystal injection hole is defined through the common electrode and the roof layer and exposes the microcavity; a liquid crystal layer disposed in the microcavity; and an encapsulation layer disposed on the roof layer, where the encapsulation layer covers the liquid crystal injection hole and seals the microcavity, in which the common electrodes in the pixel rows are connected to each other.

In an exemplary embodiment, the common electrodes may include a plurality of common electrode bridges disposed between and connected to the common electrodes in the pixel rows.

In an exemplary embodiment, each of the pixel areas may include a first subpixel area and a second subpixel area, a plurality of first valleys may be defined on the substrate between first subpixel area and second subpixel area, and a plurality of second valleys may be defined on the substrate between the pixel columns, and the common electrode bridges may be disposed at crossing points between the first valleys and the second valleys.

In an exemplary embodiment, the common electrode bridges may be disposed at all of the crossing points between the first valleys and the second valleys.

In an exemplary embodiment, the common electrode bridges may be disposed at some of the crossing points between the first valleys and the second valleys.

In an exemplary embodiment, two to a hundred pixel columns may be positioned between two adjacent common electrode bridges which are disposed in a same first valley.

In an exemplary embodiment, the common electrode bridges may be disposed at odd numbered second valleys, and may not be disposed at even numbered second valleys.

In an exemplary embodiment, the common electrode bridges may be disposed at the even numbered second valleys, and may not be disposed at the odd numbered second valleys.

In an exemplary embodiment, the common electrode bridges may be disposed at a $(3n-2)$-th second valley, and may not be disposed at a $(3n-1)$-th second valley and a $3n$-th second valley, where n is a natural number.

In an exemplary embodiment, the common electrode bridges disposed at odd numbered first valleys may be disposed at the odd numbered second valleys, and the common electrode bridges disposed at even numbered first valleys may be disposed at the even numbered second valleys.

In an exemplary embodiment, the common electrode bridges disposed at the odd numbered first valleys may be disposed at the even numbered second valleys, and the common electrode bridges disposed at the even numbered first valleys may be disposed at the odd numbered second valleys.

In an exemplary embodiment, the common electrode bridges disposed at a $(3m-2)$-th first valley may be disposed at the $(3n-2)$-th second valley, the common electrode bridges disposed at a $(3m-1)$-th first valley may be disposed at the $(3n-1)$-th second valley, and the common electrode bridges disposed at a $3m$-th first valley may be disposed at the $3n$-th second valley, where each of m and n is a natural number.

Another exemplary embodiment of the invention provides a manufacturing method of a display device, the method including: providing a thin film transistor on a substrate, on which a plurality of pixel areas arranged substantially in a matrix form having a plurality of pixel rows and a plurality of pixel columns is defined; providing a pixel electrode connected to the thin film transistor in the pixel areas; providing a plurality of sacrificial layers connected to each other along the pixel columns on the pixel electrode; providing a common electrode on the sacrificial layers; providing a roof layer on the common electrode; forming a liquid crystal injection hole, which exposes the sacrifice layers, by patterning the roof layer and the common electrode; providing a microcavity between the pixel electrode and the common electrode by removing the sacrificial layers; providing a liquid crystal layer in the microcavity by injecting a liquid crystal material through the liquid crystal injection hole; providing an encapsulation layer on the roof layer to seal the microcavity, in which portions of the patterned common electrode in the pixel rows and portions of the patterned common electrode in the pixel columns connected to each other, and the portions of the patterned common electrode in the pixel rows are connected to each other.

In an exemplary embodiment, the common electrode may include common electrode bridges disposed between and connected to the portions of the patterned common electrode in the pixel rows.

In an exemplary embodiment, each of the pixel areas may include a first subpixel area and a second subpixel area, a plurality of first valleys may be formed on the substrate between the first subpixel areas and the second subpixel area, and a plurality of second valleys may be formed on the substrate between the pixel columns, and the common electrode bridges may be provided at crossing points between the first valleys and the second valleys.

In an exemplary embodiment, the common electrode bridges may be provided at all of the crossing points between the first valleys and the second valleys.

In an exemplary embodiment, the common electrode bridges may be provided at some of the crossing points between the first valleys and the second valleys.

In an exemplary embodiment, two to a hundred pixel columns may be positioned between two adjacent common electrode bridges which are provided in a same first valley.

In an exemplary embodiment, the common electrode bridges may be provided at odd numbered second valleys, and may not be provided at even numbered second valleys.

In an exemplary embodiment, the common electrode bridges provided at odd numbered first valleys may be positioned at the odd numbered second valleys, and the common electrode bridges provided at even numbered first valleys may be positioned at the even numbered second valleys.

As described above, in exemplary embodiments of the display device and the manufacturing method thereof, the display device includes a single substrate such that the weight and thickness thereof substantially reduced, and the cost and a processing time of the manufacturing method thereof may be substantially reduced by using the single substrate. In such embodiments, common electrodes positioned in different pixel rows are connected to each other, such that an equipotential is generated substantially entirely on the common electrodes.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
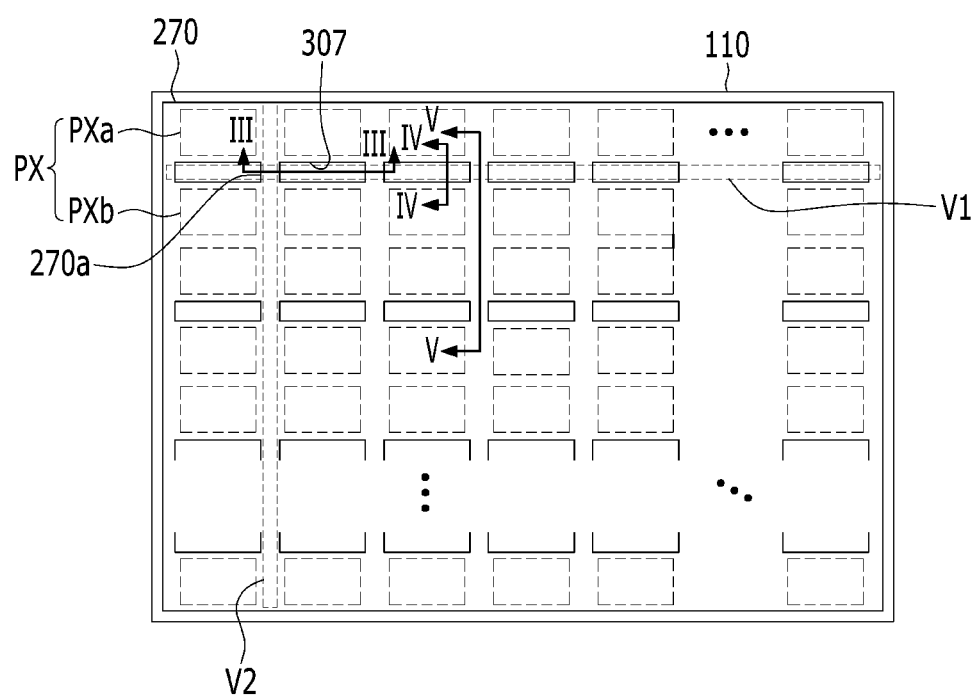
FIG. 1 is a plan view of an exemplary embodiment of a display device according to an the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

First, an exemplary embodiment of a display device according to the invention will be described below with reference to FIG. 1.

FIG. 1 is a plan view of an exemplary embodiment of a display device according to the invention.

An exemplary embodiment of the display device includes a substrate 110 including a material such as glass or plastic.

In an exemplary embodiment, a plurality of pixel areas PX is defined on the substrate 110. The pixel areas PX is arranged substantially in a matrix form including a plurality of pixel rows and a plurality of pixel columns. Each pixel area PX may include a first subpixel area PXa and a second subpixel area PXb. The first subpixel area PXa and the second subpixel area PXb may be adjacent to each other in a vertical direction, e.g., a pixel column direction.

Common electrodes 270 are disposed on the substrate 110 along the pixel rows. The common electrodes 270 disposed in different pixel rows are connected to each other. In such an embodiment, where the common electrodes 270 are connected to each other in a column direction and a row direction, an equipotential may be generated substantially on an entire of the common electrodes.

In an exemplary embodiment, a first valley V1 is defined between the first subpixel area PXa and the second subpixel area PXb in a pixel row direction, and a second valley V2 is defined between the pixel columns.

The common electrodes 270 include common electrode bridges 270*a* disposed between and connected to the common electrodes 270 in different pixel rows. The common electrode bridges 270*a* are disposed at crossing points between the first valleys V1 and the second valleys V2. In one exemplary embodiment, the common electrode bridges 270*a* may be disposed at all of the crossing points between the first valleys V1 and the second valleys V2, but not being limited thereto. In an alternative exemplary embodiment, the common electrode bridges 270*a* may be disposed at a portion of the crossing points between the first valleys V1 and the second valleys V2.

A structure of an exemplary embodiment of the display device described above may be variously modified. In an alternative exemplary embodiment, for example, an arrangement of the pixel area PX, the first valleys V1 and the second valleys V2 may be changed, and the common electrodes 270 in the different pixel rows may be connected to each other at positions other than the crossing points between the first valleys V1 and the second valleys V2.

Next, a pixel of an exemplary embodiment of the display device according to the invention will be described below with reference to FIGS. 1 to 5.

Figure 2:
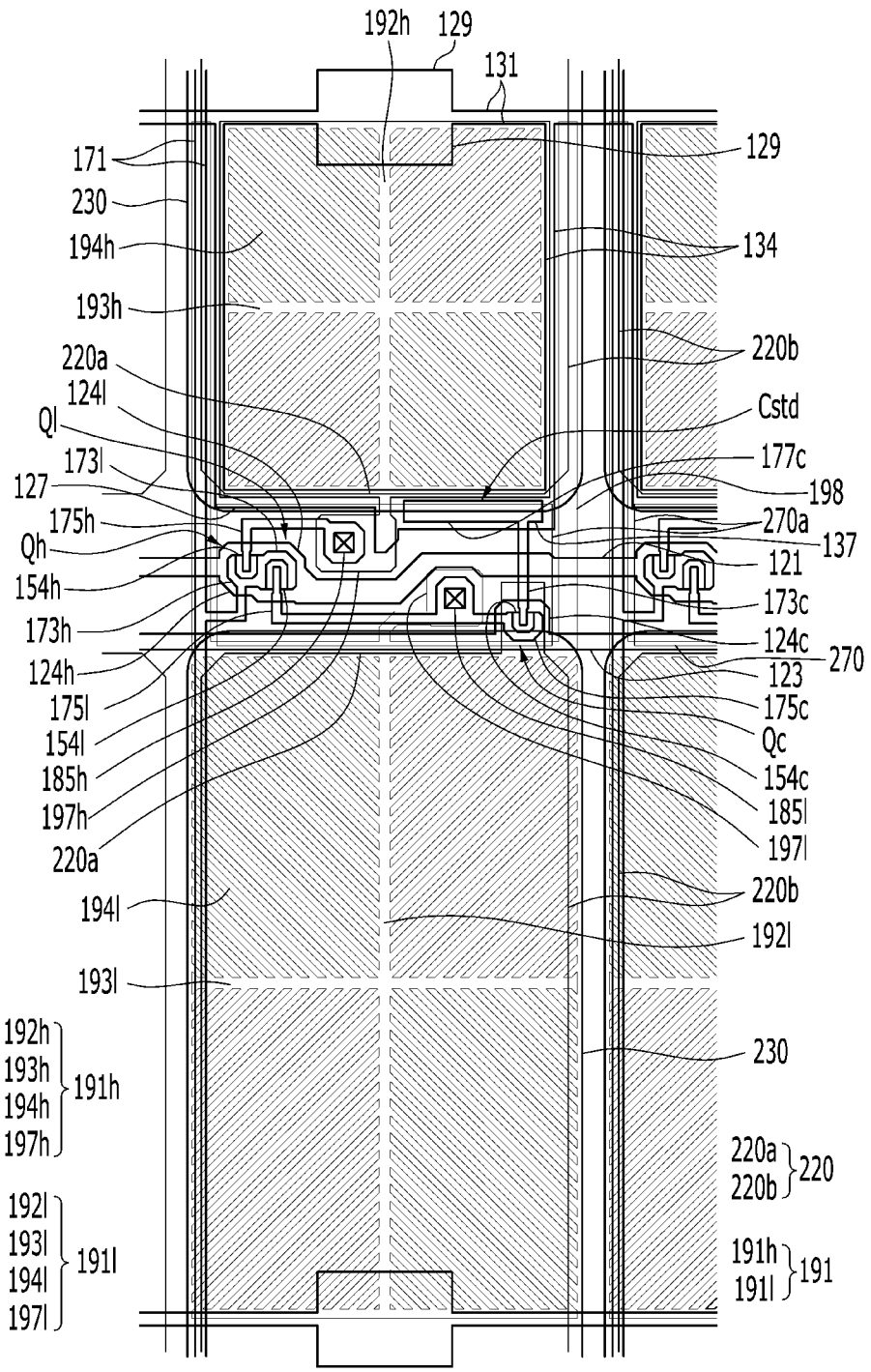
FIG. 2 is a top plan view of a pixel of an exemplary embodiment of the display device according to the invention.
Figure 3:
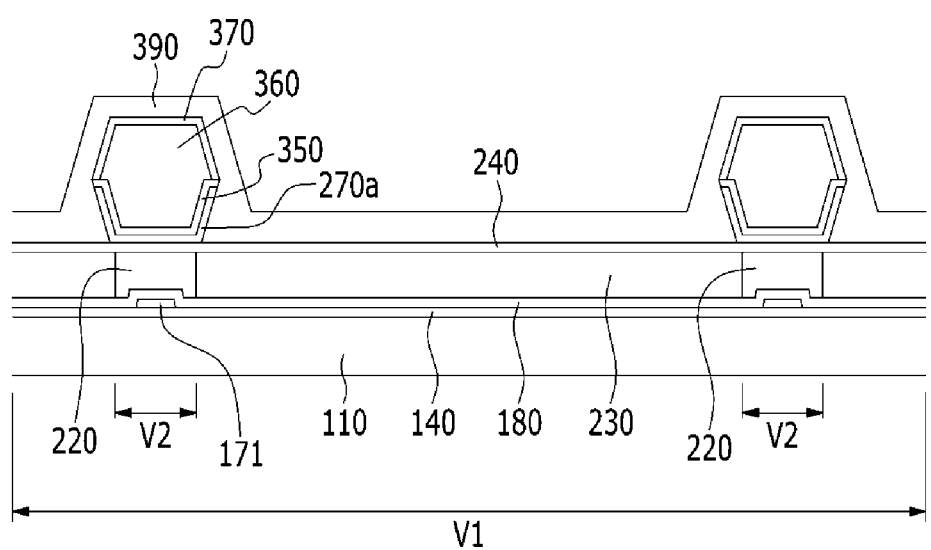
FIG. 3 is a cross-sectional view taken along line III-III of the display device in FIG. 1.
Figure 4:
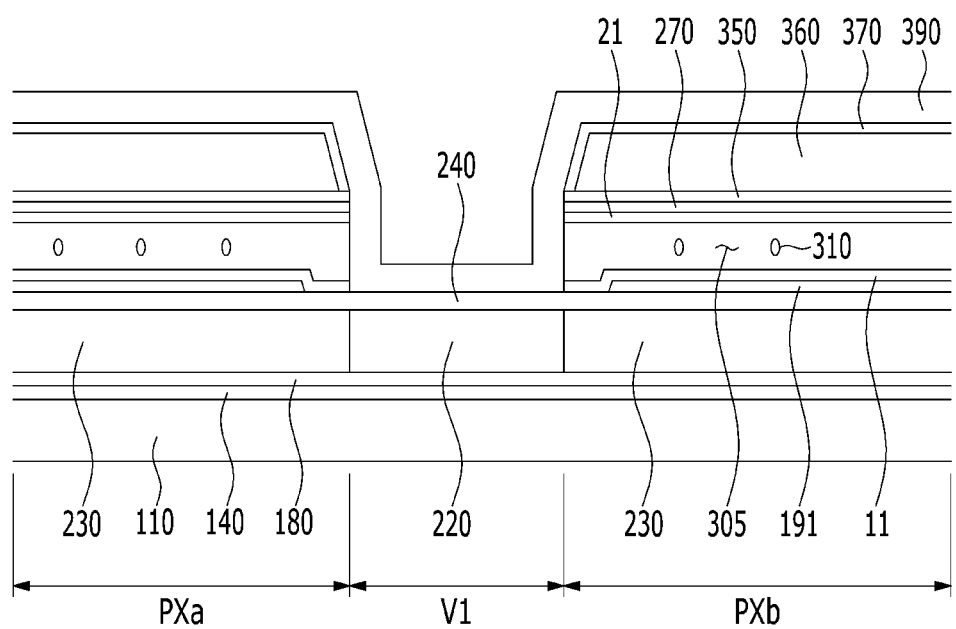
FIG. 4 is a cross-sectional view taken along line IV-IV of the display device of FIG. 1.
Figure 5:
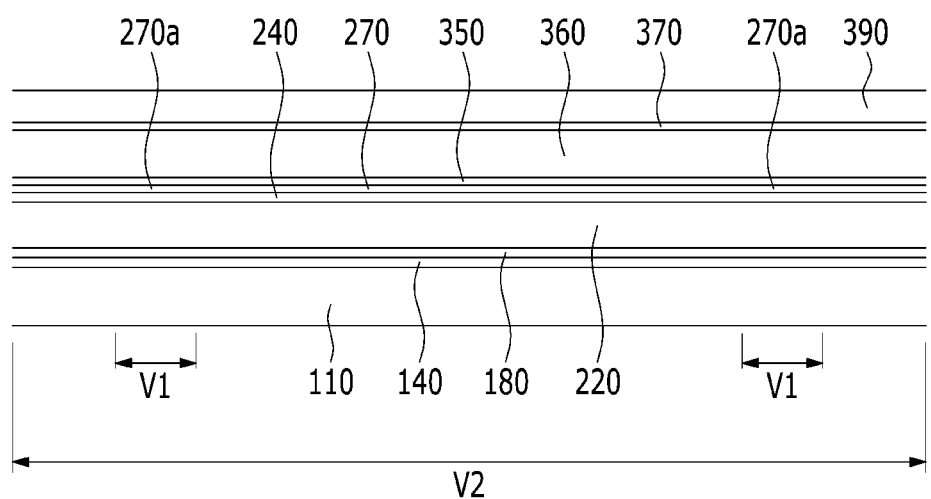
FIG. 5 is a cross-sectional view taken along line V-V of the display device of FIG. 1.

FIG. 2 is a top plan view of a pixel of an exemplary embodiment of the display device according to the invention, FIG. 3 is a cross-sectional view taken along line III-III of the display device of FIG. 1, FIG. 4 is a cross-sectional view taken along line IV-IV of the display device of FIG. 1, and FIG. 5 is a cross-sectional view taken along line V-V of the display device of FIG. 1.

Referring to FIGS. 1 to 5, an exemplary embodiment of the display device includes a substrate 110, and a plurality of gate conductors including a plurality of gate lines 121, a plurality of step-down gate lines 123 and a plurality of storage electrode lines 131 is disposed on the substrate 110.

In such an embodiment, the gate lines 121 and the step-down gate lines 123 extend substantially in a horizontal direction (e.g., a pixel row direction), and transfer gate signals. The gate conductors further include a first gate electrode 124*h* and a second gate electrode 124*l* protruding upward and downward from the gate line 121, and further include a third gate electrode 124*c* protruding upward from the step-down gate line 123. In an exemplary embodiment, the first gate electrode 124*h* and the second gate electrode 124*l* are connected to each other and define a single protrusion. In an alternative exemplary embodiment, the protrusion shape of the first, second and third gate electrodes 124*h*, 124*l* and 124*c* may be modified.

The storage electrode line 131 extends substantially in the horizontal direction and transfers a predetermined voltage such as a common voltage. The storage electrode line 131 includes storage electrodes 129 protruding upward and downward, a pair of vertical portions 134 extending downward in a direction substantially vertical to the gate line 121, and a horizontal portion 127 that connects ends of the pair of vertical portions 134 with each other. The horizontal portion 127 includes a capacitor electrode 137 expanded downward.

In an exemplary embodiment, a gate insulating layer 140 is disposed on the gate conductors 121, 123, 124*h*, 124*l*, 124*c* and 131. The gate insulating layer 140 may include an inorganic insulating material such as silicon nitride (SiNx) and silicon oxide (SiOx), for example. In an exemplary embodiment, the gate insulating layer 140 may have a single layer structure or a multi-layer structure.

In an exemplary embodiment, a first semiconductor 154*h*, a second semiconductor 154*l* and a third semiconductor 154*c* are disposed on the gate insulating layer 140. The first semiconductor 154*h* may be positioned on the first gate electrode 124*h*, the second semiconductor 154*l* may be positioned on the second gate electrode 124*l*, and the third semiconductor 154c may be positioned on the third gate electrode 124c. The first semiconductor 154h and the second semiconductor 154l may be connected to each other, and the second semiconductor 154l and the third semiconductor 154c may be connected to each other. In such an embodiment, the first semiconductor 154h may extend to a lower portion of the data line 171. The first to third semiconductors 154h, 154l and 154c may include amorphous silicon, polycrystalline silicon, metal oxide and the like, for example.

In an exemplary embodiment, ohmic contacts (not illustrated) may be further disposed on the first to third semiconductors 154h, 154l and 154c, respectively. The ohmic contact may include silicide or a material such as n+ hydrogenated amorphous silicon in which an n-type impurity is doped at high concentration.

In an exemplary embodiment, a plurality of data conductors including a data line 171, a first source electrode 173h, a second source electrode 173l, a third source electrode 173c, a first drain electrode 175h, a second drain electrode 175l and a third drain electrode 175c is disposed on the first to third semiconductors 154h, 154l and 154c.

The data line 171 transfers a data signal, and extends substantially in a vertical direction crossing the gate line 121 and the step-down gate line 123. The data line 171 includes a first source electrode 173h and a second source electrode 173l which protrude toward the first gate electrode 124h and the second gate electrode 124l and are connected to each other.

Each of the first drain electrode 175h, the second drain electrode 175l and the third drain electrode 175c includes a wide end portion and a rod-shaped end portion. The rod-shaped end portions of the first drain electrode 175h and the second drain electrode 175l are partially surrounded by the first source electrode 173h and the second source electrode 173l. The wide end portion of the second drain electrode 175l further extends and is connected to a third source electrode 173c having a U-like shape. A wide end portion 177c of the third drain electrode 175c overlaps the capacitor electrode 137 and thereby defines a step-down capacitor Cstd, and the rod-shaped end portion is partially surrounded by the third source electrode 173c.

The first gate electrode 124h, the first source electrode 173h and the first drain electrode 175h collectively define a first thin film transistor Qh together with the first semiconductor 154h. The second gate electrode 124l, the second source electrode 173l and the second drain electrode 175l collectively define a second thin film transistor Ql together with the second semiconductor 154l. The third gate electrode 124c, the third source electrode 173c and the third drain electrode 175c collectively define the third thin film transistor Qc together with the third semiconductor 154c.

The first semiconductor 154h, the second semiconductor 154l and the third semiconductor 154c may be connected to each other, may have a linear shape, and may have substantially the same plane shape as the data conductors 171, 173h, 173l, 173c, 175h, 175l and 175c and the ohmic contacts therebelow, except for portions thereof in channel regions between the source electrodes 173h, 173l, and 173c and the drain electrodes 175h, 175l and 175c.

The first semiconductor 154h includes an exposed portion which is not covered by the first source electrode 173h and the first drain electrode 175h and disposed between the first source electrode 173h and the first drain electrode 175h. The second semiconductor 154l includes an exposed portion which is not covered by the second source electrode 173l and the second drain electrode 175l and disposed between the second source electrode 173l and the second drain electrode 175l. The third semiconductor 154c includes an exposed portion which is not covered by the third source electrode 173c and the third drain electrode 175c and disposed between the third source electrode 173c and the third drain electrode 175c.

In an exemplary embodiment, a passivation layer 180 is disposed on the data conductors 171, 173h, 173l, 173c, 175h, 175l, and 175c and the exposed portions of the semiconductors 154h, 154l and 154c between corresponding source and drain electrodes 173h/173l/173c and 175h/175l/175c. The passivation layer 180 may include an organic insulating material or an inorganic insulating material, and may have a single layer structure or a multi-layer structure.

In an exemplary embodiment, a color filter 230 is disposed in each pixel area PX on the passivation layer 180. In an exemplary embodiment, each color filter 230 may display one of primary colors such as three primary colors of red, green and blue, for example, but not being limited thereto. In an alternative exemplary embodiment, each color filter 230 may display one of cyan, magenta, yellow and white-based colors, for example. In an alternative exemplary embodiment, the color filter 230 may extend substantially in the pixel column direction and disposed between the adjacent data lines 171.

In an exemplary embodiment, a light blocking member 220 is disposed between the adjacent color filters 230. The light blocking member 220 may be disposed on a boundary of the pixel area PX and the thin film transistor to effectively prevent light leakage. The light blocking member 220 extends along the gate line 121 and the step-down gate line 121, and includes a horizontal light blocking member 220a which covers regions in which the first thin film transistor Qh, the second thin film transistor Ql, and the third thin film transistor Qc are positioned, and a vertical light blocking member 220b which extends along the data line 171. In such an embodiment, the horizontal light blocking member 220a may be disposed in the first valley V1, and the vertical light blocking member 220b may be disposed in the second valley V2. The color filter 230 and the light blocking member 220 may at least partially overlap each other.

In an exemplary embodiment, a first insulating layer 240 may be disposed on the color filter 230 and the light blocking member 220. The first insulating layer 240 may include an inorganic insulating material such as silicon nitride (SiNx) and silicon oxide (SiOx), for example. The first insulating layer 240 protects the color filter 230 and the light blocking member 220 which include the organic materials. In an alternative exemplary embodiment, the first insulating layer 240 may be omitted.

In an exemplary embodiment, a plurality of first contact holes 185h and a plurality of second contact holes 185l, which expose the wide end portion of the first drain electrode 175h and the wide end portion of the second drain electrode 175l, respectively, are defined in the first insulating layer 240, the light blocking member 220 and the passivation layer 180.

In an exemplary embodiment, a pixel electrode 191 is disposed on the first insulating layer 240. The pixel electrode 191 may include a transparent metal material such as indium tin oxide ("ITO") and indium zinc oxide ("IZO"), for example.

The pixel electrode 191 includes the first subpixel electrode 191h and the second subpixel electrode 191l, which are spaced apart from each other with the gate line 121 and the step-down gate line 123 therebetween and disposed in an upper portion and a lower portion of the pixel area PX, respectively, with respect to the gate line 121 and the step-down gate line 123 such that the first subpixel electrode 191h and the second subpixel electrode 191l are disposed adjacent to each other in the pixel column direction. In such an embodiment, the first subpixel electrode 191h and the second subpixel electrode 191*l* may be spaced from each other with the first valley V1 therebetween, the first subpixel electrode 191*h* may be in the first subpixel area PXa, and the second subpixel electrode 191*l* may be in the second subpixel area PXb.

The first subpixel electrode 191*h* and the second subpixel electrode 191*l* are connected to the first drain electrode 175*h* and the second drain electrode 175*l* through the first contact hole 185*h* and the second contact hole 185*l*, respectively. In such an embodiment, when the first thin film transistor Qh and the second thin film transistor Ql are turned on, the first thin film transistor Qh and the second thin film transistor Ql receive data voltages from the first drain electrode 175*h* and the second drain electrode 175*l*.

An overall shape of each of the first subpixel electrode 191*h* and the second subpixel electrode 191*l* is substantially a quadrangle, and the first subpixel electrode 191*h* and the second subpixel electrode 191*l* include stems having a cross-like shape and including horizontal stems 193*h* and 193*l* and vertical stems 192*h* and 192*l* which cross the horizontal stems 193*h* and 193*l*, respectively. In such an embodiment, the first subpixel electrode 191*h* and the second subpixel electrode 191*l* include minute branches 194*h* and 194*l*, and protrusions 197*h* and 197*l* protruding upward or downward from a side of the first and second subpixel electrodes 191*h* and 191*l*, respectively, toward each other.

Each of the first subpixel electrode 191*h* or the second subpixel electrode 191*l* is divided into four subregions by the horizontal stems 193*h* and 193*l* and the vertical stems 192*h* and 192*l* thereof. The minute branches 194*h* and 194*l* obliquely extend from the horizontal stems 193*h* and 193*l* and the vertical stems 192*h* and 192*l*, and the extending direction of the minute branches 194*h* and 194*l* may form an angle of about 45 degrees or about 135 degrees with the gate line 121 or the horizontal stems 193*h* and 193*l*. In an exemplary embodiment, as shown in FIG. 2, the extending directions of the minute branches 194*h* and 194*l* in two adjacent subregions may be substantially perpendicular to each other.

In an exemplary embodiment, the first subpixel electrode 191*h* further includes an outer stem that defines outer portion thereof, and the second subpixel electrode 191*l* includes horizontal portions positioned at upper and lower end portions thereof, and left and right vertical portions 198 positioned at left and right sides of the first subpixel electrode 191*a*. The left and right vertical portions 198 may effectively prevent capacitive binding, e.g., coupling, between the data line 171 and the first subpixel electrode 191*h*.

The structure of the thin film transistor and the shape of the pixel electrode are not limited to structure of the thin film transistor and the shape of the pixel electrode in the exemplary embodiment described above, and may be variously modified.

In an exemplary embodiment, common electrodes 270 are disposed on the pixel electrode 191 and spaced apart from the pixel electrode 191 at a predetermined distance. In an exemplary embodiment, a microcavity 305 is defined between the pixel electrode 191 and the common electrodes 270. In such an embodiment, the microcavity 305 is surrounded by the pixel electrode 191 and the common electrodes 270. In an exemplary embodiment, a width and an area of the microcavity 305 may be variously modified based on resolution of the display device.

The common electrodes 270 may include a transparent metal material such as ITO and IZO, for example. A predetermined voltage may be applied to the common electrodes 270, and an electric field may be generated between the pixel electrode 191 and the common electrodes 270.

In an exemplary embodiment, the common electrodes 270 may be disposed directly on the first insulating layer 240 at the second valley V2, and thus the common electrodes 270 may cover a left side and a right side of the microcavity 305. In such an embodiment, the common electrodes 270 are connected to each other along the pixel rows. In such an embodiment, where the microcavity 305 is not defined below a portion of the common electrodes 270 positioned at the second valley V2, a height of the common electrodes 270 positioned at the second valley V2 is less than a height of the common electrode positioned in the pixel area PX.

The common electrodes 270 include common electrode bridges 270*a* that are disposed between and connected to the common electrodes 270 in the different pixel rows. The common electrode bridges 270*a* may be disposed at the crossing points between the first valleys V1 and the second valleys V2.

In a display device, where the common electrodes 270 positioned in the different pixel rows are not connected to each other, there may be a difference between a common voltage of the common electrodes 270 at a point close to a point to which the common voltage is applied and a common voltage of the common electrodes 270 at a point far away from the point to which the common voltage is applied. In an exemplary embodiment of the display device according to the invention, the common electrodes 270 positioned in the different pixel rows are connected to each other by the common electrode bridges 270*a*, such that the difference between the common voltages according to a position is substantially reduced.

The common electrodes 270 are not disposed in the partial region of the first valley V1. In such an embodiment, the common electrodes 270 may not cover at least a portion of the upper side and the lower side of the pixel area PX, and thus the microcavity 305 is exposed outside. The side where the microcavity 305 is exposed is also referred to as a liquid crystal injection hole 307. The liquid crystal injection hole 307 is defined at the first valley V1, and a liquid crystal material is provided in, e.g., injected into, the microcavity 307 through the liquid crystal injection hole 307.

In an exemplary embodiment, as described above, the common electrodes 270 may cover the left side and the right side of the microcavity 305 and expose at least a portion of the upper side and the lower side of the microcavity 305, but the invention is not limited thereto. In an alternative exemplary embodiment, the common electrodes 270 may cover another side of the microcavity 305. In one exemplary embodiment, for example, the common electrodes 270 may cover the upper side and the lower side of the microcavity 305 and expose at least a portion of the left side and the right side of the microcavity 305. In such an embodiment, the liquid crystal injection hole 307 may be defined at the second valley V2.

In an exemplary embodiment, a liquid crystal layer including liquid crystal molecules 310 is disposed in the microcavity 305 positioned between the pixel electrode 191 and the common electrodes 270. The liquid crystal molecules 310 have negative dielectric anisotropy and may be aligned in a vertical direction with respect to the substrate 110 when the electric field is not generated therein such that a vertical alignment may occur.

In an exemplary embodiment, a first alignment layer 11 is disposed on the pixel electrode 191. The first alignment layer 11 may cover a portion of the first insulating layer 240 which is exposed by the pixel electrode 191.

In an exemplary embodiment, a second alignment layer 21 is disposed below the common electrodes 270 and opposite to the first alignment layer 11.

Each of the first alignment layer 11 and the second alignment layer 21 may include a vertical alignment layer, and may include materials such as polyamic acid, polysiloxane and polyimide, for example. The first and second alignment layers 11 and 21 may be connected to each other at an edge of the pixel area PX.

The first subpixel electrode 191h and the second subpixel electrode 191l, to which the data voltages are applied, generate an electric field together with the common electrodes 270 to determine directions of the liquid crystal molecules 310 positioned in the microcavity 305 between the pixel and common electrodes 191 and 270. In such an embodiment, luminance of light passing through the liquid crystal layer varies according to the determined directions of the liquid crystal molecules 310.

In an exemplary embodiment, a second insulating layer 350 may be disposed on the common electrodes 270. The second insulating layer 350 may include an inorganic insulating material such as silicon nitride (SiNx) and silicon oxide (SiOx), for example. In an alternative exemplary embodiment, the second insulating layer 350 may be omitted.

In an exemplary embodiment, a roof layer 360 is disposed on the second insulating layer 350. The roof layer 360 may include an organic material. The microcavity 305 is below the roof layer 360, and a shape of the microcavity 305 may be maintained by the roof layer 360.

The roof layers 360 are connected to each other along the pixel rows, and the liquid crystal injection hole 307 is defined along the first valley V1 in the roof layer 360 and thus the microcavity 305 is exposed outside of the roof layer 360.

In an exemplary embodiment, a third insulating layer 370 may be disposed on the roof layer 360. The third insulating layer 370 may include an inorganic insulating material such as silicon nitride (SiNx) and silicon oxide (SiOx), for example. The third insulating layer 370 may cover the upper side and the side of the roof layer 360. The third insulating layer 370 may protect the roof layer 360 including an organic material. In an alternative exemplary embodiment, the third insulating layer 370 may be omitted.

In an exemplary embodiment, an encapsulation layer 390 may be disposed on the third insulating layer 370. The encapsulation layer 390 may cover the liquid crystal injection hole 307 which exposes a portion of the microcavity 305 to outside. In such an embodiment, the encapsulation layer 390 may seal the microcavity 305 such that the liquid crystal molecules 310 in the microcavity 305 are effectively prevented from being discharged outside. In an exemplary embodiment, where the encapsulation layer 390 contacts the liquid crystal molecules 310, the encapsulation layer 390 may include a material which does not react with the liquid crystal molecules 310. In one exemplary embodiment, for example, the encapsulation layer 390 may include parylene or the like.

The encapsulation layer 390 may have a multi-layer structure such as a double layer structure and a triple layer structure. In an exemplary embodiment, where the encapsulation layer 390 has the double layer structure, two layers of the double layer structure may include different materials from each other. In an exemplary embodiment, where the encapsulation layer 390 has the triple layer, adjacent layers of triple layer structure may include materials different from each other. In one exemplary embodiment, for example, the encapsulation layer 390 may include a layer including an organic insulating material or a layer including an inorganic insulating material.

In an exemplary embodiment, polarizers (not shown) may be disposed on the upper and lower surfaces of the display device. In an exemplary embodiment, the polarizers may include a first polarizer and a second polarizer. In such an embodiment, the first polarizer may be attached onto the lower side of the substrate 110, and the second polarizer may be attached onto the encapsulation layer 390.

Next, an exemplary embodiment of a manufacturing method of a display device according to the invention will be described below with reference to FIGS. 6 to 11, and with reference again to FIGS. 2 to 5.

FIGS. 6 to 11 are cross-sectional views illustrating an exemplary embodiment of a manufacturing method of a display device according to the invention.

Figure 6:
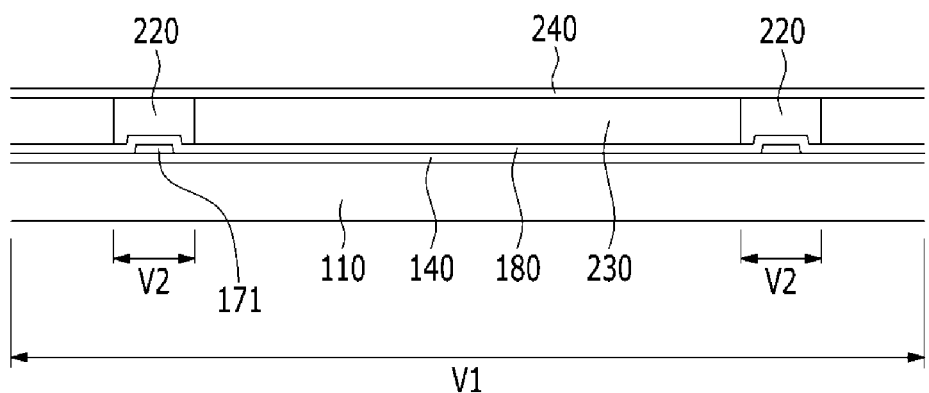
FIGS. 6 to 11 are cross-sectional views illustrating an exemplary embodiment of a manufacturing method of a display device according to the invention.

In an exemplary embodiment, as illustrated in FIG. 6, a gate line 121 and a step-down gate line 123 extending in a first direction (e.g., the pixel row direction) are provided, e.g., formed, on a substrate 110 including glass or plastic, and a first gate electrode 124h, a second gate electrode 124l and a third gate electrode 124c which protrude from the gate line 121 are provided on the substrate 110.

In such an embodiment, the storage electrode line 131 may be provided on the substrate 110 to be spaced apart from the gate line 121, the step-down gate line 123 and the first to third gate electrodes 124h, 124l, and 124c.

In an exemplary embodiment, a gate insulating layer 140 is provided on substantially an entire upper surface of the substrate 110 including the gate line 121, the step-down gate line 123, the first to third gate electrodes 124h, 124l and 124c, and the storage electrode line 131 using an inorganic insulating material such as silicon oxide (SiOx) or silicon nitride (SiNx), for example. The gate insulating layer 140 may have a single layer structure or a multi-layer structure.

In an exemplary embodiment, a first semiconductor 154h, a second semiconductor 154l and a third semiconductor 154c are provided on the gate insulating layer 140. In such an embodiment, a first semiconductor 154h, a second semiconductor 154l and a third semiconductor 154c may be provided by depositing a semiconductor material such as amorphous silicon, polycrystalline silicon and metal oxide on the gate insulating layer 140, for example, and then patterning the deposited semiconductor material. The first semiconductor 154h may be positioned on the first gate electrode 124h, the second semiconductor 154l may be positioned on the second gate electrode 124l, and the third semiconductor 154c may be positioned on the third gate electrode 124c.

In an exemplary embodiment, a data line 171 extending in a second direction (e.g., the pixel column direction) is provided on the gate insulating layer 140. In such an embodiment, the data line 171 may be provided by depositing a metallic material on the gate insulating layer 140 and then patterning the deposited metallic material. In such an embodiment, the deposited metallic material may have a single layer structure or a multilayer structure.

In an exemplary embodiment, a first source electrode 173h protruding over the first gate electrode 124h from the data line 171 and a first drain electrode 175h spaced apart from the first source electrode 173h may be provided together. In such an embodiment, a second source electrode 173l connected to the first source electrode 173h and a second drain electrode 175l spaced apart from the second source electrode 173l may be provided together. In such an embodiment, a third source electrode 173c extending from the second drain electrode 175l and a third drain electrode 175c spaced apart from the third source electrode 173c may be provided together.

The first to third semiconductors 154h, 154l and 154c, the data line 171, the first to third source electrodes 173h, 173l and 173c, and the first to third drain electrodes 175h, 175l and 175c may be formed by sequentially depositing a semiconductor material and a metallic material, and then patterning the sequentially deposited semiconductor and metallic materials at the same time. In such an embodiment, the first semiconductor 154h may extend below the data line 171.

The first gate electrode 124h, the first source electrode 173h and the first drain electrode 175h collectively define a first thin film transistor ("TFT") Qh together with the first semiconductors 154h. The second gate electrode 124l, the second source electrode 173l and the second drain electrode 175l collectively define a second TFT Ql together with the second semiconductor 154l. The third gate electrode 124c, the third source electrode 173c and the third drain electrode 175c collectively define a third TFT Qc together with the third semiconductor 154c.

In an exemplary embodiment, a passivation layer 180 is provided on the data line 171, the first to third source electrodes 173h, 173l and 173c, the first to third drain electrodes 175h, 175l and 175c, and exposed portions of the semiconductors 154h, 154l and 154c between corresponding source and drain electrodes. The passivation layer 180 may include an organic insulating material or an inorganic insulating material, and may have a single layer structure or a multi-layer structure.

In an exemplary embodiment, color filters 230 are provided in each pixel area PX on the passivation layer 180. The color filters 230 having a same color may be arranged in the column direction of the pixel areas PXs. In an exemplary embodiment, where the color filters 230 have three colors, a first colored color filter 230 may be provided using a mask, a second colored color filter 230 may be provided by shifting the mask, and then a third colored color filter may be provided by further shifting the mask.

In an exemplary embodiment, a light blocking member 220 is provided on a boundary of each pixel area PX on the passivation layer 180 and on the TFTs.

In an exemplary embodiment, the light blocking member 220 may be provided after providing the color filters 230, but the invention is not limited thereto. In an alternative exemplary embodiment, the color filters 230 may be formed after providing the light blocking member 220.

In an exemplary embodiment, a first insulating layer 240 including an inorganic insulating material such as silicon nitride (SiNx) and silicon oxide (SiOx), for example, is provided on the color filter 230 and the light blocking member 220.

In an exemplary embodiment, a first contact hole 185h is formed by etching the passivation layer 180, the light blocking member 220 and the first insulating layer 240 to expose a portion of the first drain electrode 175h, and a second contact hole 185l is formed to expose a portion of the second drain electrode 175l.

In an exemplary embodiment, a first subpixel electrode 191h is provided in the first subpixel area PXa, and a second subpixel electrode 191l is provided in the second subpixel area PXb, by depositing and patterning a transparent metal material such as ITO and IZO on the first insulating layer 240. The first subpixel electrode 191h and the second subpixel electrode 191l are separated from each other with the first valley V1 therebetween. The first subpixel electrode 191h is connected to the first drain electrode 175h through the first contact hole 185h, and the second subpixel electrode 191l is connected to the second drain electrode 175l through the second contact hole 185l.

In an exemplary embodiment, horizontal stems 193h and 193l, and vertical stems 192h and 192l crossing the horizontal stems 193h and 193l are provided in the first subpixel electrode 191h and the second subpixel electrode 191l, respectively. In such an embodiment, a plurality of minute branches 194h and 194l which obliquely extend from the horizontal stems 193h and 193l and the vertical stems 192h and 192l is provided.

Figure 7:
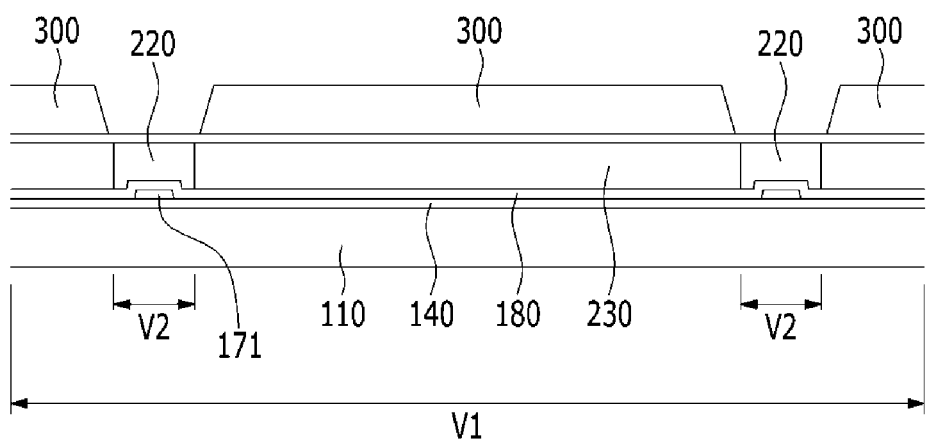

As illustrated in FIG. 7, a sacrificial layer 300 is provided by coating a photosensitive organic material on the pixel electrode 191 and using a photolithography process.

The sacrificial layers 300 are formed to be connected to each other along the pixel columns. In such an embodiment, the sacrificial layer 300 covers the pixel areas PX and covers the first valley V1 positioned between the first subpixel area PXa and the second subpixel area PXb.

Figure 8:
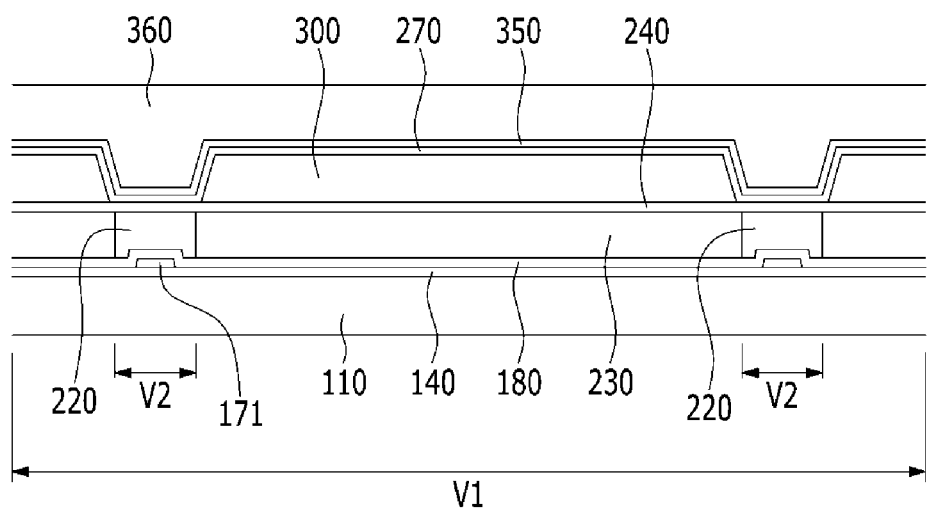

As illustrated in FIG. 8, a common electrode 270 is provided on the sacrificial layer 300 by depositing a transparent metal material such as ITO and IZO, for example.

Next, a second insulating layer 350 may be provided on the common electrode 270 using an inorganic insulating material such as silicon oxide (SiOx) and silicon nitride (SiNx), for example.

In an exemplary embodiment, a roof layer 360 is provided on the second insulating layer 350 with an organic material.

Figure 9:
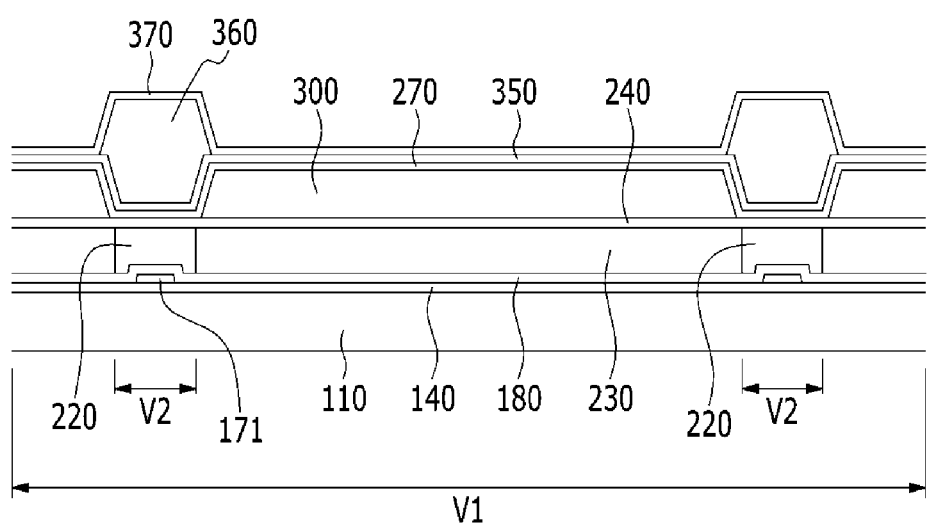

As illustrated in FIG. 9, a portion of the roof layer 360 positioned at the first valley V1 may be removed by patterning the roof layer 360. A portion of the roof layer 360 positioned at the crossing point between the first valley V1 and the second valley V2 is not removed.

In an exemplary embodiment, the third insulating layer 370 may be provided on the roof layer 360 using an inorganic insulating material such as silicon nitride (SiNx) and silicon oxide (SiOx), for example. The third insulating layer 370 is provided on the patterned roof layer 360 to cover and protect the side of the roof layer 360.

Figure 10:
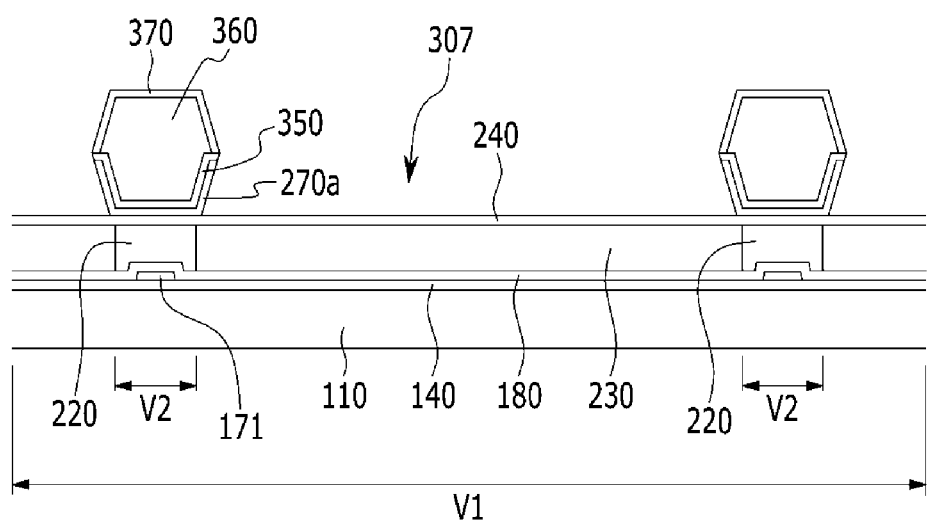

As illustrated in FIG. 10, portions of the third insulating layer 370, the second insulating layer 350 and the common electrode 270 at the first valley V1 are removed by patterning the third insulating layer 370, the second insulating layer 350 and the common electrode 270. In such an embodiment, other portions of the third insulating layer 370, the second insulating layer 350 and the common electrode 270 at the crossing point between the first valley V1 and the second valley V2 are not removed.

In such an embodiment, portions of the patterned common electrode 270 in the pixel rows extend along the pixel rows, and portions of the patterned common electrode 270 in different pixel rows are connected to each other by portions of the patterned common electrode 270 at the crossing point between the first valley V1 and the second valley V2. The portions of the patterned common electrode 270 at the crossing point between the first valley V1 and the second valley V2 may be referred to as common electrode bridges 270a that connect the portions of the patterned common electrode 270 in the different pixel rows to each other. Accordingly, in such an embodiment, the common electrode bridges 270a are provided at the crossing points between the first valleys V1 and the second valleys V2.

A portion of the sacrificial layer 300 positioned below a portion where the common electrode 270 is removed is exposed by the patterned the common electrode 270.

In an exemplary embodiment, the sacrificial layer 300 is substantially entirely removed by supplying a developer on the substrate 110 where the sacrificial layer 300 thereon is exposed. In an alternative exemplary embodiment, the sacrificial layer 300 is substantially entirely removed using an ashing process.

In such an embodiment, when the sacrificial layer 300 is removed, the microcavity 305 is formed in a space occupied by the sacrificial layer 300.

The pixel electrode 191 and the common electrode 270 are spaced apart from each other with the microcavity 305 interposed therebetween, and the pixel electrode 191 and the roof layer 360 are spaced apart from each other with the microcavity 305 interposed therebetween. The common electrode 270 and the roof layer 360 are provided to cover the top and opposing sides of the microcavity 360.

The microcavity 305 is exposed outside through a portion where the roof layer 360 and the common electrode 270 are removed, which is also referred to as the liquid crystal injection hole 307. In an exemplary embodiment, the liquid crystal injection hole 307 may be formed at the first valley V1. In an alternative exemplary embodiment, the liquid crystal injection hole 307 may be formed at the second valley V2.

In an exemplary embodiment, the roof layer 360 is cured by applying heat to the substrate 110 such that the shape of the microcavity 305 is substantially maintained by the roof layer 360.

In an exemplary embodiment, when an aligning agent including an alignment material is provided, e.g., dropped, on the substrate 110 by a spin coating method or an inkjet method, the aligning agent is injected into the microcavity 305 through the liquid crystal injection hole 307. When the aligning agent is injected into the microcavity 305, a curing process is performed, and a solution component is evaporated such that the alignment material remains on an inner wall of the microcavity 305.

Accordingly, the first alignment layer 11 may be provided on the pixel electrode 191, and the second alignment layer 21 may be provided below the common electrode 270. The first alignment layer 11 and the second alignment layer 21 may be disposed opposite to, e.g., facing, each other with the microcavity 305 therebetween, and are connected to each other at the edge of the pixel area PX.

In an exemplary embodiment, the first and second alignment layers 11 and 21 may be aligned substantially in a vertical direction with respect to the substrate 110 except for a portion thereof at the side of the microcavity 305. In an exemplary embodiment, a process of irradiating ultraviolet ("UV") light to the first and second alignment layers 11 and 21 may be performed, and the first and second alignment layers 11 and 21 may be aligned substantially in a horizontal direction to the substrate 110.

In an exemplary embodiment, when the liquid crystal material including liquid crystal molecules 310 is provided, e.g., dropped, on the substrate 110 by an inkjet method or a dispensing method, the liquid crystal material is injected into the microcavity 305 through the liquid crystal injection hole 307. In such an embodiment, the liquid crystal material may be dropped in the liquid crystal injection holes 307 formed along odd-numbered first valleys V1 and may not be dropped in the liquid crystal injection holes 307 formed along even-numbered first valleys V1. In an alternative exemplary embodiment, the liquid crystal material may be dropped in the liquid crystal injection holes 307 formed along the even-numbered first valleys V1 and may not be dropped in the liquid crystal injection holes 307 formed along the odd-numbered first valleys V1.

In an exemplary embodiment, where the liquid crystal material is dropped in the liquid crystal injection holes 307 formed along the odd-numbered first valleys V1, the liquid crystal material passes through the liquid crystal injection holes 307 by capillary force, thereby being injected into the microcavity 305. In such an embodiment, the liquid crystal material may be substantially effectively injected into the microcavity 305 by discharging air in the microcavity 305 through the liquid crystal injection holes 307 formed along the even-numbered first valleys V1.

In an exemplary embodiment, the liquid crystal material may be provided, e.g., dropped, in all the liquid crystal injection holes 307. In such an embodiment, the liquid crystal material may be dropped in the liquid crystal injection holes 307 formed along the odd-numbered first valleys V1 and the liquid crystal injection holes 307 formed along the even-numbered first valleys V1.

Figure 11:
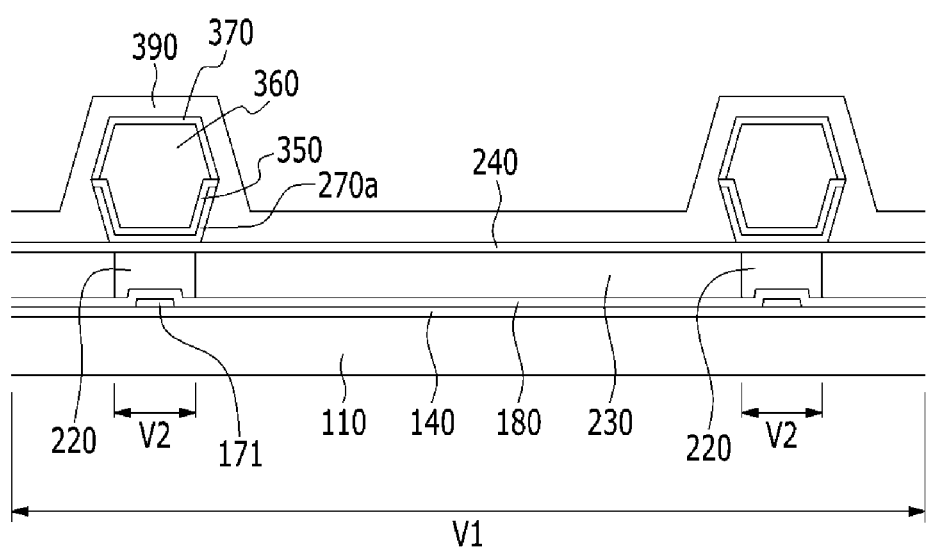

As illustrated in FIG. 11, an encapsulation layer 390 is provided on the third insulating layer 370 by depositing a material which does not react with the liquid crystal molecules 310. The encapsulation layer 390 covers the liquid crystal injection hole 307 that exposes the microcavity 305 to seal the microcavity 305.

In an exemplary embodiment, polarizers (not shown) may be further provided on the upper and lower sides of the display device. The polarizers may include a first polarizer and a second polarizer. In one exemplary embodiment, for example, the first polarizer may be attached onto the lower side of the substrate 110, and the second polarizer may be attached onto the encapsulation layer 390.

Next, an alternative exemplary embodiment of a display device according to the invention will be described below with reference to FIG. 12.

Figure 12:
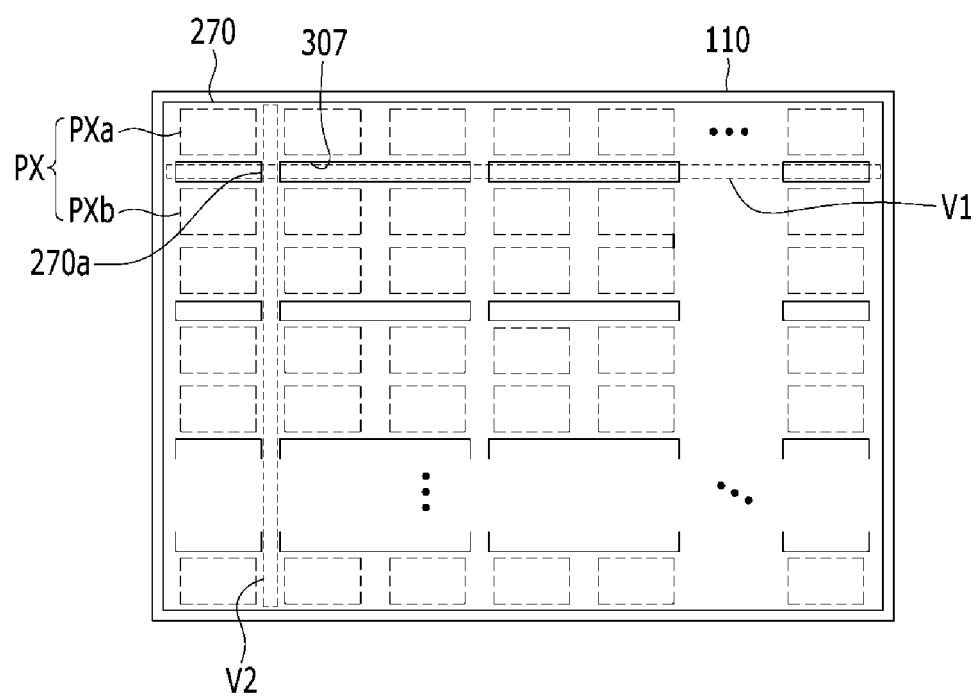
FIGS. 12 to 15 are plan views illustrating alternative exemplary embodiments of a display device according to the invention.

FIG. 12 is a plan view of an alternative exemplary embodiment of a display device according to the invention.

The display device illustrated in FIG. 12 is substantially the display device illustrated in FIGS. 1 to 5 except for the common electrode bridges. The same or like elements shown in FIG. 12 have been labeled with the same reference characters as used above to describe the exemplary embodiments of the display device shown in FIG. 1, and any repetitive detailed description thereof will hereinafter be omitted or simplified.

In such an embodiment, the display device includes a thin film transistor and a pixel electrode 191 connected to the thin film transistor, which are disposed on a substrate 110. Common electrodes 270 are disposed on the pixel electrode 191, and the common electrodes 270 and the pixel electrode 191 are spaced apart from each other with a microcavity 305 therebetween. A liquid crystal layer including liquid crystal molecules 310 is disposed in the microcavity 305, and an encapsulation layer 390 is disposed on the common electrodes 270 to seal the microcavity 305.

The common electrodes 270 are disposed along the pixel rows, and the common electrodes 270 in the different pixel rows are connected to each other. In such an embodiment, the common electrodes 270 are connected to each other in the pixel column direction and the pixel row direction such that an equipotential may be generated substantially entirely on the common electrodes.

The common electrodes 270 include common electrode bridges 270a that is disposed between and connected to the common electrodes 270 in different pixel rows. The common electrode bridges 270a are disposed at crossing points between the first valleys V1 and the second valleys V2. In an exemplary embodiment, as shown in FIG. 1, the common electrode bridges 270a may be disposed at all of the crossing points between the first valleys V1 and the second valleys V2. In an alternative exemplary embodiment, as shown in FIG. 12, the common electrode bridges 270a are disposed only at some of the crossing points between the first valleys V1 and the second valleys V2.

In one exemplary embodiment, for example, the common electrode bridge 270a is disposed at only one crossing point of two crossing points which are adjacent to each other in the pixel row direction, as shown in FIG. 12. In such an embodiment, the common electrode bridges 270a are disposed at the odd numbered second valleys V2 and are not disposed at the even numbered second valleys V2. In such an embodiment, two pixel columns are positioned between two adjacent common electrode bridges 270a which are disposed in a same first valley V1.

In such an embodiment, the arrangement of the common electrode bridges 270a is not limited to the arrangement described above and may be variously modified. In one alternative exemplary embodiment, for example, the common electrode bridges 270a may be disposed at the even numbered second valleys V2 and may not be disposed at the odd numbered second valleys V2.

Next, another alternative exemplary embodiment of a display device according to the invention will be described below with reference to FIG. 13.

Figure 13:
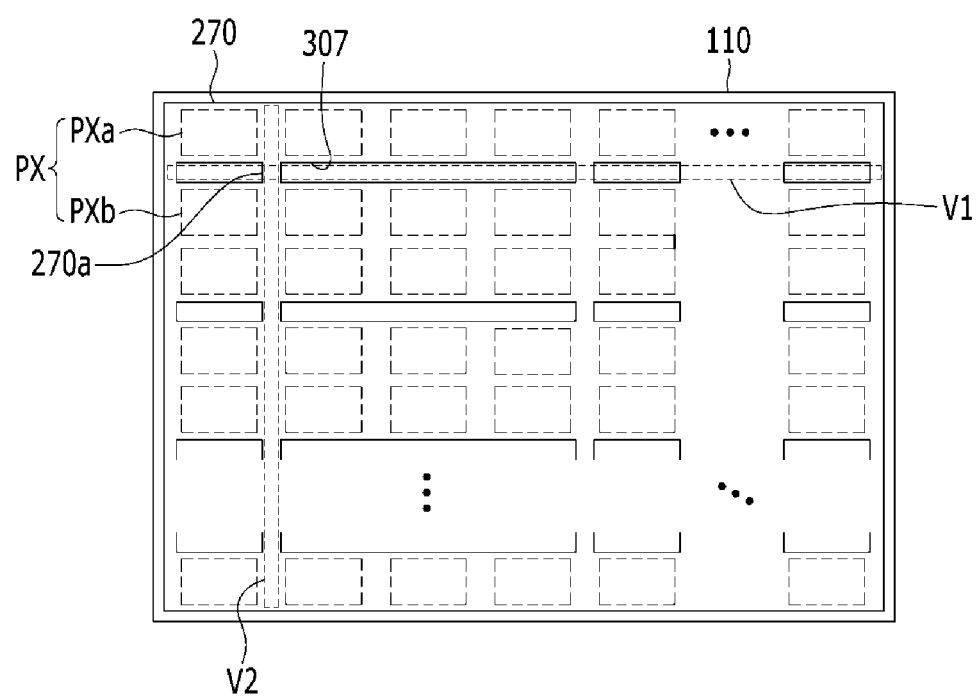

FIG. 13 is a plan view of another alternative exemplary embodiment of a display device according to the invention.

The display device illustrated in FIG. 13 is substantially the display device illustrated in FIG. 1 except for the common electrode bridges. The same or like elements shown in FIG. 13 have been labeled with the same reference characters as used above to describe the exemplary embodiments of the display device shown in FIG. 1, and any repetitive detailed description thereof will hereinafter be omitted or simplified.

In an exemplary embodiment, as shown in FIG. 12, the common electrode bridges 270a may be disposed at only one cross point of two cross points adjacent to each other in a row direction. In an alternative exemplary embodiment, as shown in FIG. 13, the common electrode bridge 270a may be disposed at only one crossing point among three crossing points which are adjacent to each other in the pixel row direction. In such an embodiment, the common electrode bridges 270a may be disposed at a (3n−2)-th second valley V2 and are not disposed at a (3n−1)-th second valley V2 and a 3n-th second valley V2. Here, n is a natural number. In such an embodiment, three pixel columns are positioned between two adjacent common electrode bridges 270a which are disposed in a same first valley V1.

In such an embodiment, the arrangement of the common electrode bridges 270a is not limited to the arrangement described above, and may be variously modified. In one alternative exemplary embodiment, for example, the common electrode bridges 270a may be disposed at the (3n−1)-th second valley V2 and may not be disposed at the (3n−2)-th second valley V2 and the 3n-th second valley V2. In another alternative exemplary embodiment, the common electrode bridges 270a may be disposed at the 3n-th second valley V2 and may not be disposed at the (3n−2)-th second valley V2 and the (3n−1)-th second valley V2.

In another alternative exemplary embodiment, the common electrode bridge 270a may be disposed at only one crossing point among four crossing points which are adjacent to each other in the pixel row direction. In another alternative exemplary embodiment, the common electrode bridge 270a is disposed at only one crossing point of a hundred cross points which are adjacent to each other in the pixel row direction. In such embodiments, four to a hundred pixel columns may be positioned between two adjacent common electrode bridges 270a which are disposed in a same first valley V1.

Next, another alternative exemplary embodiment of a display device according to the invention will be described below with reference to FIG. 14.

Figure 14:
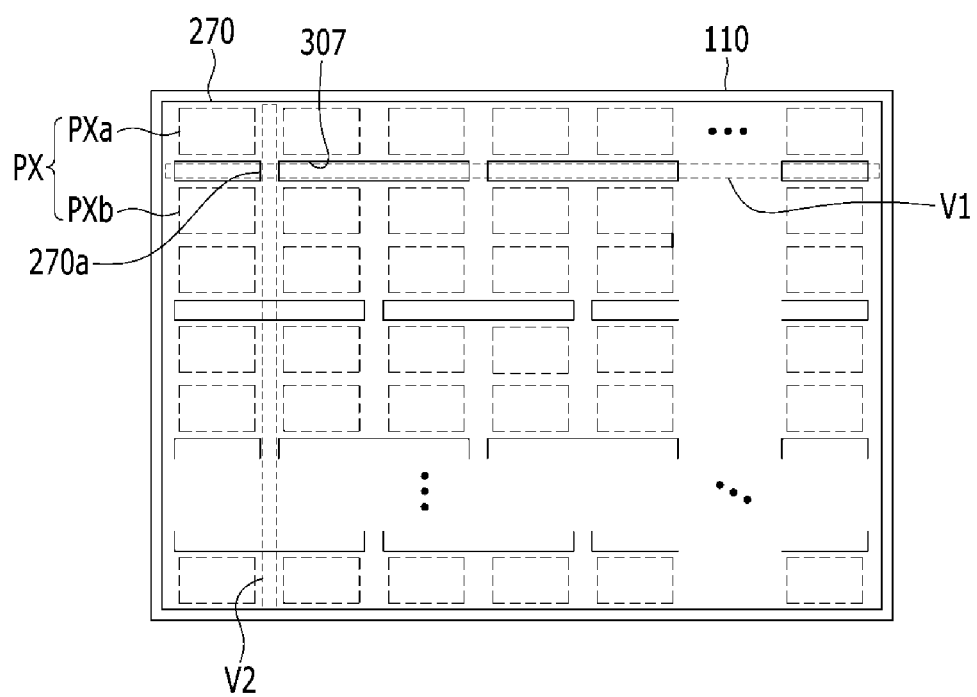

FIG. 14 is a plan view of another alternative exemplary embodiment of a display device according to the invention.

The display device illustrated in FIG. 14 is substantially the display device illustrated in FIG. 1 except for the common electrode bridges. The same or like elements shown in FIG. 14 have been labeled with the same reference characters as used above to describe the exemplary embodiments of the display device shown in FIG. 1, and any repetitive detailed description thereof will hereinafter be omitted or simplified.

In such an embodiment, the display device includes a thin film transistor and a pixel electrode 191 connected to the thin film transistor, which are disposed on a substrate 110. Common electrodes 270 are disposed on the pixel electrode 191, and the common electrodes 270 and the pixel electrode 191 are spaced apart from each other with a microcavity 305 therebetween. A liquid crystal layer including liquid crystal molecules 310 is disposed in the microcavity 305, and an encapsulation layer 390 is disposed on the common electrodes 270 to seal the microcavity 305.

The common electrodes 270 are disposed along the pixel rows, and the common electrodes 270 positioned in different pixel rows are connected to each other. In such an embodiment, the common electrodes 270 are connected to each other in the pixel column direction and the pixel row direction, an equipotential may be generated substantially entirely on the common electrodes.

The common electrodes 270 include common electrode bridges 270a that is disposed between and connected to the common electrodes 270 positioned in the different pixel rows. The common electrode bridges 270a are disposed at crossing points between the first valleys V1 and the second valleys V2. In an exemplary embodiment, as shown in FIG. 1, the common electrode bridges 270a are disposed at all of the crossing points between the first valleys V1 and the second valleys V2. In alternative exemplary embodiment, as shown in FIG. 14, the common electrode bridges 270a may be disposed only at some of the crossing points between the first valleys V1 and the second valleys V2.

In one exemplary embodiment, for example, the common electrode bridges 270a disposed at the odd numbered first valleys V1 may be disposed at the odd numbered second valleys V2 and may not be disposed at the even numbered second valleys V2. In such an embodiment, the common electrode bridges 270a disposed at the odd numbered first valleys V1 may be disposed at the even numbered second valleys V2 and may not be disposed at the odd numbered second valleys V2. In the above exemplary embodiment, the common electrode bridges 270a are disposed at the crossing points between the odd numbered first valleys V1 and the odd numbered second valleys V2 and at the crossing points between the even numbered first valleys V1 and the even numbered second valleys V2 such that the common electrode bridges 270a may be arranged substantially in a zigzag form.

The arrangement of the common electrode bridges 270a is not limited to the arrangement described above and may be variously modified. In one alternative exemplary embodiment, for example, the common electrode bridges 270a disposed at the odd numbered first valleys V1 may be disposed at the even numbered second valleys V2, and the common electrode bridges 270a disposed at the even numbered first valleys V1 may be disposed at the odd numbered second valleys V2.

Next, another alternative exemplary embodiment of a display device according to the invention will be described below with reference to FIG. 15.

Figure 15:
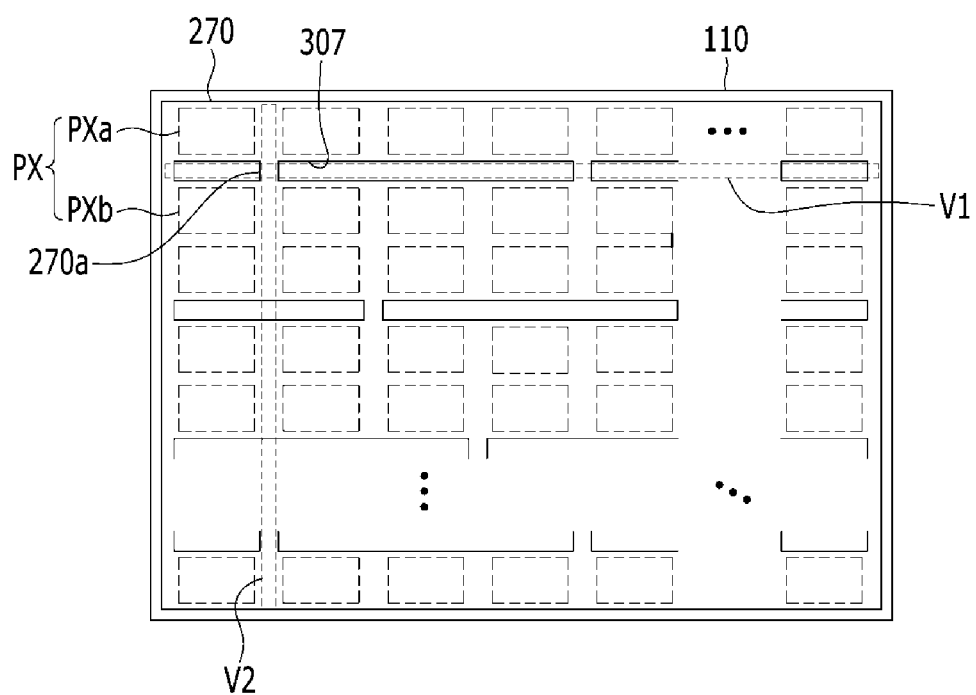

FIG. 15 is a plan view illustrating another alternative exemplary embodiment of a display device according to the invention.

The display device illustrated in FIG. 15 is substantially the display device illustrated in FIG. 1 except for the common electrode bridges. The same or like elements shown in FIG. 15 have been labeled with the same reference characters as used above to describe the exemplary embodiments of the display device shown in FIG. 1, and any repetitive detailed description thereof will hereinafter be omitted or simplified.

In an exemplary embodiment, the common electrode bridge 270a is disposed at only one crossing point among three crossing points which are adjacent to each other in the pixel row direction.

In one exemplary embodiment, for example, the common electrode bridges 270a disposed at a (3m−2)-th first valley V1 may be disposed at the (3n−2)-th second valley V2, and may not be disposed at the 3n−1-th second valleys V2 and the 3n-th second valleys V2. Here, m is a natural number. In such an embodiment, the common electrode bridges 270a disposed in a (3m−1)-th first valley V1 may be disposed at the 3n−1-th second valley V2, and may not be disposed in the (3n−2)-th second valley V2 and the 3n-th second valley V2. In such an embodiment, the common electrode bridges 270a disposed in a 3m-th first valley V1 may be disposed at the 3n-th second valley V2, and may not be disposed at the (3n−2)-th second valley V2 and the (3n−1)-th second valley V2. In such an embodiment, the common electrode bridges 270a are disposed at the crossing points between the (3m−2)-th first valley V1 and the (3n−2)-th second valley V2, the crossing points between the (3m−1)-th first valley V1 and the (3n−1)-th second valley V2, and the crossing points between the 3m-th first valley V1 and the 3n-th second valley V2.

The arrangement of the common electrode bridges 270a is not limited to the arrangement described above and may be variously modified. In one alternative exemplary embodiment, for example, the common electrode bridges 270a may be disposed at the cross points between the (3m−2)-th first valleys V1 and the (3n−1)-th second valleys V2, the cross points between the (3m−1)-th first valleys V1 and the 3n-th second valleys V2, and the cross points between the 3m-th first valleys V1 and the (3n−2)-th second valleys V2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a substrate, on which a plurality of pixel areas arranged substantially in a matrix form having a plurality of pixel rows and a plurality of pixel columns is defined;
a thin film transistor disposed on the substrate;
a pixel electrode disposed in the pixel areas and connected to the thin film transistor;
a plurality of common electrodes disposed on the pixel electrode and spaced apart from the pixel electrode, wherein a microcavity is defined between the pixel electrode and the common electrodes;
a roof layer disposed on the common electrodes, wherein a liquid crystal injection hole is defined through the common electrodes and the roof layer and exposes the microcavity;
a liquid crystal layer disposed in the microcavity; and
an encapsulation layer disposed on the roof layer, wherein the encapsulation layer covers the liquid crystal injection hole and seals the microcavity,
wherein the common electrodes in the pixel rows are connected to each other.

2. The display device of claim 1, wherein
the common electrodes comprise a plurality of common electrode bridges disposed between and connected to the common electrodes in the pixel rows.

3. The display device of claim 2, wherein
each of the pixel areas comprises a first subpixel area and a second subpixel area,
a plurality of first valleys is defined on the substrate between first subpixel area and second subpixel area, and
a plurality of second valleys is defined on the substrate between the pixel columns, and
the common electrode bridges are disposed at crossing points between the first valleys and the second valleys.

4. The display device of claim 3, wherein
the common electrode bridges are disposed at all of the crossing points between the first valleys and the second valleys.

5. The display device of claim 3, wherein
the common electrode bridges are disposed at some of the crossing points between the first valleys and the second valleys.

6. The display device of claim 5, wherein
two to a hundred pixel columns are positioned between two adjacent common electrode bridges which are disposed in a same first valley.

7. The display device of claim 3, wherein
the common electrode bridges are disposed at odd numbered second valleys, and are not disposed at even numbered second valleys.

8. The display device of claim 3, wherein
the common electrode bridges are disposed at even numbered second valleys, and are not disposed at odd numbered second valleys.

9. The display device of claim 3, wherein
the common electrode bridges are disposed at a (3n−2)-th second valley, and are not disposed at a (3n−1)-th second valley and a 3n-th second valley,
wherein n is a natural number.

10. The display device of claim 3, wherein
the common electrode bridges disposed in odd numbered first valleys are disposed at odd numbered second valleys, and
the common electrode bridges disposed in even numbered first valleys are disposed at even numbered second valleys.

11. The display device of claim 3, wherein
the common electrode bridges disposed in odd numbered first valleys are disposed at even numbered second valleys, and
the common electrode bridges disposed in even numbered first valleys are disposed at odd numbered second valleys.

12. The display device of claim 3, wherein
the common electrode bridges disposed at a (3m−2)-th first valley are disposed at a (3n−2)-th second valley,
the common electrode bridges disposed at a (3m−1)-th first valley are disposed at a (3n−1)-th second valley, and
the common electrode bridges disposed at a 3m-th first valley are disposed at a 3n-th second valley,
wherein each of m and n is a natural number.

13. A manufacturing method of a display device, the method comprising:
providing a thin film transistor on a substrate, on which a plurality of pixel areas arranged substantially in a matrix form having a plurality of pixel rows and a plurality of pixel columns is defined;

providing a pixel electrode connected to the thin film transistor in the pixel areas;
providing a plurality of sacrificial layers connected to each other along the pixel columns on the pixel electrode;
providing a common electrode on the sacrificial layers;
providing a roof layer on the common electrode;
forming a liquid crystal injection hole, which exposes the sacrificial layers, by patterning the roof layer and the common electrode;
providing a microcavity between the pixel electrode and the common electrode by removing the sacrificial layers;
providing a liquid crystal layer in the microcavity by injecting a liquid crystal material through the liquid crystal injection hole; and
providing an encapsulation layer on the roof layer to seal the microcavity,
wherein portions of the patterned common electrode in the pixel rows and portions of the patterned common electrode in the pixel columns connected to each other, and
the portions of the patterned common electrode in the pixel rows are connected to each other.

14. The manufacturing method of a display device of claim 13, wherein
the patterned common electrode comprises a plurality of common electrode bridges disposed between and connected to the portions of the patterned common electrode in the pixel rows.

15. The manufacturing method of a display device of claim 14, wherein
each of the pixel areas comprises a first subpixel area and a second subpixel area,
a plurality of first valleys is formed on the substrate between the first subpixel area and the second subpixel area, and
a plurality of second valleys is formed on the substrate between the pixel columns, and
the common electrode bridges are provided at crossing points between the first valleys and the second valleys.

16. The manufacturing method of a display device of claim 15, wherein
the common electrode bridges are provided at all of the crossing points between the first valleys and the second valleys.

17. The manufacturing method of a display device of claim 15, wherein
the common electrode bridges are provided at some of the crossing points between the first valleys and the second valleys.

18. The manufacturing method of a display device of claim 17, wherein
two to a hundred pixel columns are positioned between two adjacent common electrode bridges which are in a same first valley.

19. The manufacturing method of a display device of claim 15, wherein
the common electrode bridges are provided at odd numbered second valleys, and are not provided at even numbered second valleys.

20. The manufacturing method of a display device of claim 15, wherein
the common electrode bridges provided in odd numbered first valleys are positioned at odd numbered second valleys, and
the common electrode bridges provided in even numbered first valleys are positioned at even numbered second valleys.

* * * * *